United States Patent [19]
Phillips et al.

[11] Patent Number: 5,600,516
[45] Date of Patent: Feb. 4, 1997

[54] DEFLECTABLE CRASH STOP IN ACTUATOR ARM ASSEMBLY OVERMOLD

[75] Inventors: Brian L. Phillips, San Jose; Lawrence W. Gollbach, Felton, both of Calif.

[73] Assignee: Seagate Technology, Inc., Scotts Valley, Calif.

[21] Appl. No.: 567,398

[22] Filed: Dec. 5, 1995

Related U.S. Application Data

[63] Continuation of Ser. No. 214,777, Mar. 17, 1994, abandoned.

[51] Int. Cl.$^6$ ........................................... G11B 5/54
[52] U.S. Cl. ............................................... 360/105
[58] Field of Search .................................. 360/105–106, 360/86

[56] References Cited

U.S. PATENT DOCUMENTS

| | | | |
|---|---|---|---|
| 4,985,793 | 1/1991 | Anderson | 360/105 |
| 4,996,617 | 2/1991 | Yaeger et al. | 360/105 |
| 5,034,837 | 7/1991 | Schmitz | 360/106 |
| 5,134,608 | 7/1992 | Strickler et al. | 360/105 |
| 5,184,265 | 2/1993 | Foote et al. | 360/106 |
| 5,187,627 | 2/1993 | Hickox et al. | 360/105 |
| 5,305,170 | 4/1994 | Dion | 360/105 |
| 5,313,354 | 5/1994 | Sampietro et al. | 360/105 |
| 5,365,389 | 11/1994 | Jabbari et al. | 360/105 |
| 5,404,258 | 4/1995 | Arin et al. | 360/106 |
| 5,455,726 | 10/1995 | Liu | 360/106 |
| 5,477,403 | 12/1995 | Strickler | 360/105 |
| 5,483,399 | 1/1996 | Jeong et al. | 360/105 |

FOREIGN PATENT DOCUMENTS 3-254480  11/1991  Japan ..................................... 360/105

*Primary Examiner*—Robert S. Tupper
*Assistant Examiner*—Brian E. Miller
*Attorney, Agent, or Firm*—Westman, Champlin & Kelly, P.A.

[57] ABSTRACT

An actuator arm assembly includes an actuator arm and a voice coil coupled to the actuator arm. A crash stop is connected to the actuator arm and extends away from a perimeter of the actuator arm.

12 Claims, 6 Drawing Sheets

DEFLECTABLE CRASH STOP IN ACTUATOR ARM ASSEMBLY OVERMOLD

This is a continuation of application Ser. No. 08/214,777, filed Mar. 17, 1994, now abandoned.

BACKGROUND OF THE INVENTION

The present invention relates to disc drives. More particularly, the present invention relates to crash stops on an actuator arm assembly used in moving a head gimbal assembly across the surface of a disc in a disc drive.

A typical magnetic disc drive includes one or more magnetic discs, a transducer supported by a hydrodynamic air bearing which flies above each magnetic disc, and a drive controller for controlling the disc drive based on commands received from a host system. The drive controller controls the disc drive to retrieve information from the magnetic discs and to store information on the magnetic discs.

An electromechanical actuator operates within a negative feedback, closed-loop servo system. The actuator moves the transducer radially over the disc surface for track seek operations and holds the transducer directly over a track on the disc surface for track following operations.

Information is typically stored on the magnetic discs by providing a write signal to the transducer to encode flux reversals on the surface of the magnetic disc representing the data to be stored. In retrieving data from the disc, the drive controller controls the electromechanical actuator so that the transducer flies above the magnetic disc, sensing the flux reversals on the magnetic disc and generating a read signal based on those flux reversals. The read signal is then decoded by the drive controller to recover the data represented by flux reversals stored on the magnetic disc, and consequently represented in the read signal provided by the transducer.

Conventionally, the electromechanical actuator includes an actuator arm assembly which is coupled to a head gimbal assembly (which includes the transducer and hydrodynamic air bearing). The actuator arm assembly is controlled to pivot about a pivot point to move the head gimbal assembly over the surface of the disc to a desired radial position. The actuator arm assembly typically includes an actuator arm and a voice coil which is connected to the actuator arm. A magnet, or group of magnets, is positioned relative to the voice coil such that when the disc drive controller causes current to flow through the voice coil, the fields generated by the voice coil interact with the magnetic field provided by the magnets to cause movement of the actuator arm assembly about the pivot point.

Such actuator arm assemblies are movable between two extreme positions. In the first extreme position, the actuator arm assembly is positioned to hold the hydrodynamic air bearing over the inner most radius of the magnetic disc. In the second extreme position, the actuator arm assembly is positioned to hold the hydrodynamic air bearing over the outer most radius of the disc.

In order to prevent the actuator arm assembly from moving beyond the first or second extreme positions and off of the surface of the disc, crash stops and stop pins have conventionally been connected inside the housing of the disc drive to physically prevent the actuator arm assembly from moving beyond either the first or second extreme positions. The stop pins are conventionally removable pins which are fastened to a base plate of the housing with screws, or by press fitting. The crash stops are conventionally resilient members which are screwed or press fit into the stop pins. The crash stops extend out and away from the stop pins so that, just before the actuator arm assembly reaches one of the first or second extreme positions, it engages the crash stop. If the actuator arm assembly continues toward the first or second extreme position, it forces the crash stop to deflect toward the stop pin. This deflection continues until the portion of the crash stop which extends away from the stop pin comes into physical contact with the stop pin. At that point, movement of the actuator arm assembly is substantially halted so that the actuator arm assembly cannot move beyond the extreme position.

Because the crash stops and stop pins are conventionally both discrete parts, each must to be assembled into the disc drive. Whether these parts are connected by press fitting or through the use of screws, they are quite labor intensive to assemble. In addition, because these parts are discrete parts, each of the parts must be stocked, and included in the parts count of the disc drive. Thus, the parts undesirably increase the cost of the disc drive and decrease assembly efficiency.

SUMMARY OF THE INVENTION

An actuator arm assembly includes an actuator arm and a voice coil coupled to the actuator arm. A crash stop is connected to the actuator arm and extends away from a perimeter of the actuator arm.

In one preferred embodiment, the voice coil is coupled to the actuator arm through the use of an overmold. The crash stop is formed integrally with the overmold and extends away from the perimeter of the actuator arm.

In another preferred embodiment, a pair of crash stops are formed integrally with the overmold and extend from opposite edges of the actuator arm. At least one of the stop pins is formed integrally with the base plate of the disc drive housing and is positioned to engage the corresponding crash stop.

DETAILED DESCRIPTION OF THE PREFERRED EMBODIMENTS

Figure 1:
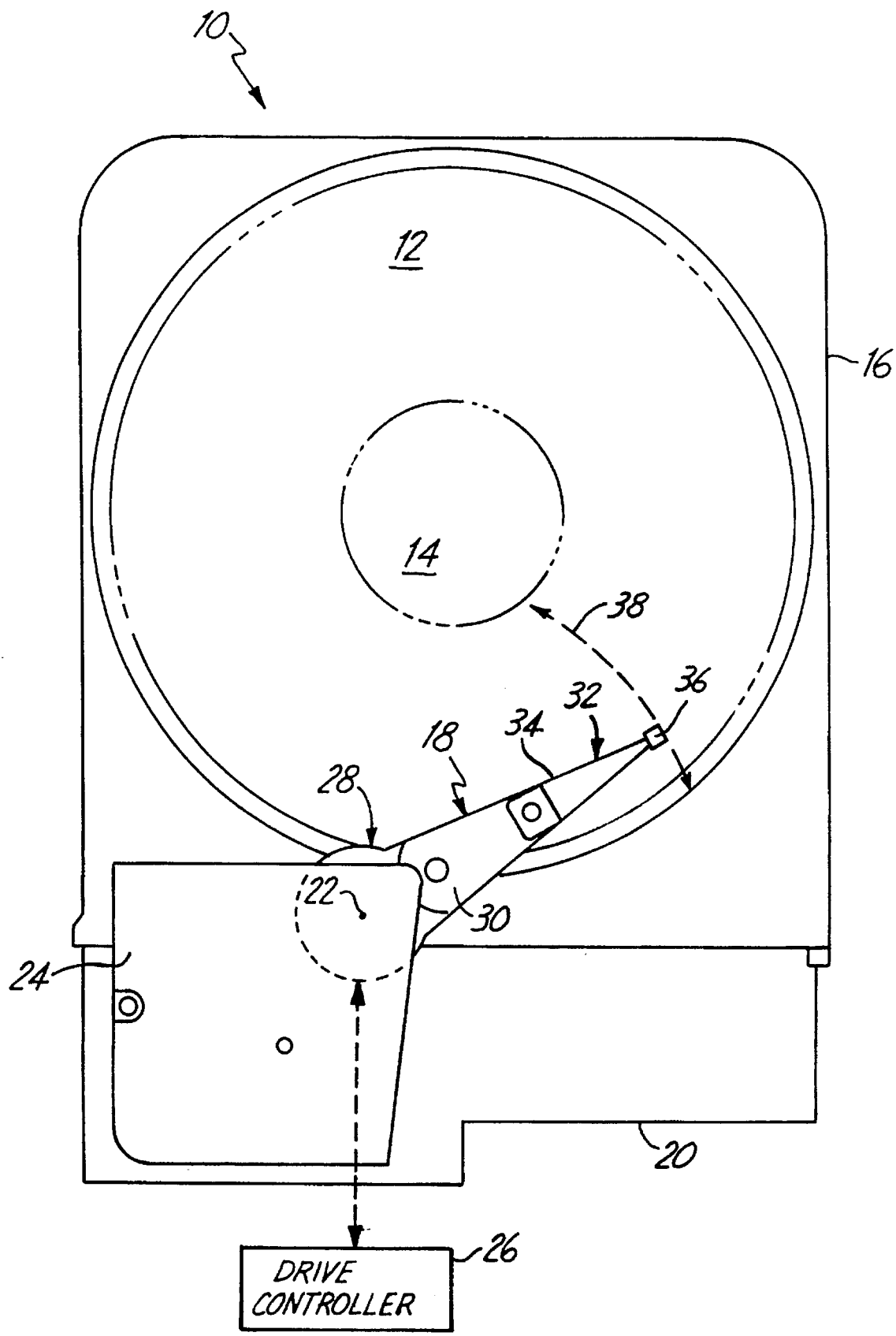
FIG. 1 is a top view of a disc drive.

FIG. 1 is a top view of a disc drive 10 of the present invention. Disc drive 10 includes a magnetic disc 12 mounted for rotational movement about and axis defined by spindle 14 within housing 16. Disc drive 10 also includes a stacked actuator system 18 mounted to a base plate 20 of housing 16 and pivotally movable relative to disc 14 about axis 22.

A cover 24 covers a portion of stacked actuator system 18. Drive controller 26 is coupled to stacked actuator system 18. In the preferred embodiment, drive controller 26 is either mountable within disc drive 10, or is located outside of disc drive 10 with suitable connection to stacked actuator system 18.

In a preferred embodiment, stacked actuator system 18, which will be described in greater detail later in the specification, includes an actuator arm assembly 28, a rigid support member 30, and a head gimbal assembly 32. Head gimbal assembly 32 includes a load beam or flexure arm 34 coupled to rigid member 30, and a hydrodynamic air bearing (a slider) coupled by a gimbal (not shown) to load beam 34. Slider 36 supports a transducer for reading information from disc 12 and encoding information on disc 12.

During operation, drive controller 26 receives position information indicating a portion of disc 12 to be accessed. Drive controller 26 receives the position information from an operator, from a host computer, or from another suitable controller. Based on the position information, drive controller 26 provides a position signal to stacked actuator system 18. The position signal causes stacked actuator system 18 to pivot about axis 22. This, in turn, causes slider 36 (and consequently the transducer mounted on slider 36) to move radially over the surface of disc 12 in a generally arcuate path indicated by arrow 38. Drive controller 26 and stacked actuator system 18 operate in a known closed loop, negative feedback manner so that the transducer carried by slider 36 is positioned over the desired portion of disc 12. Once the transducer is appropriately positioned, drive controller 26 then executes a desired read or write operation.

Figure 2:
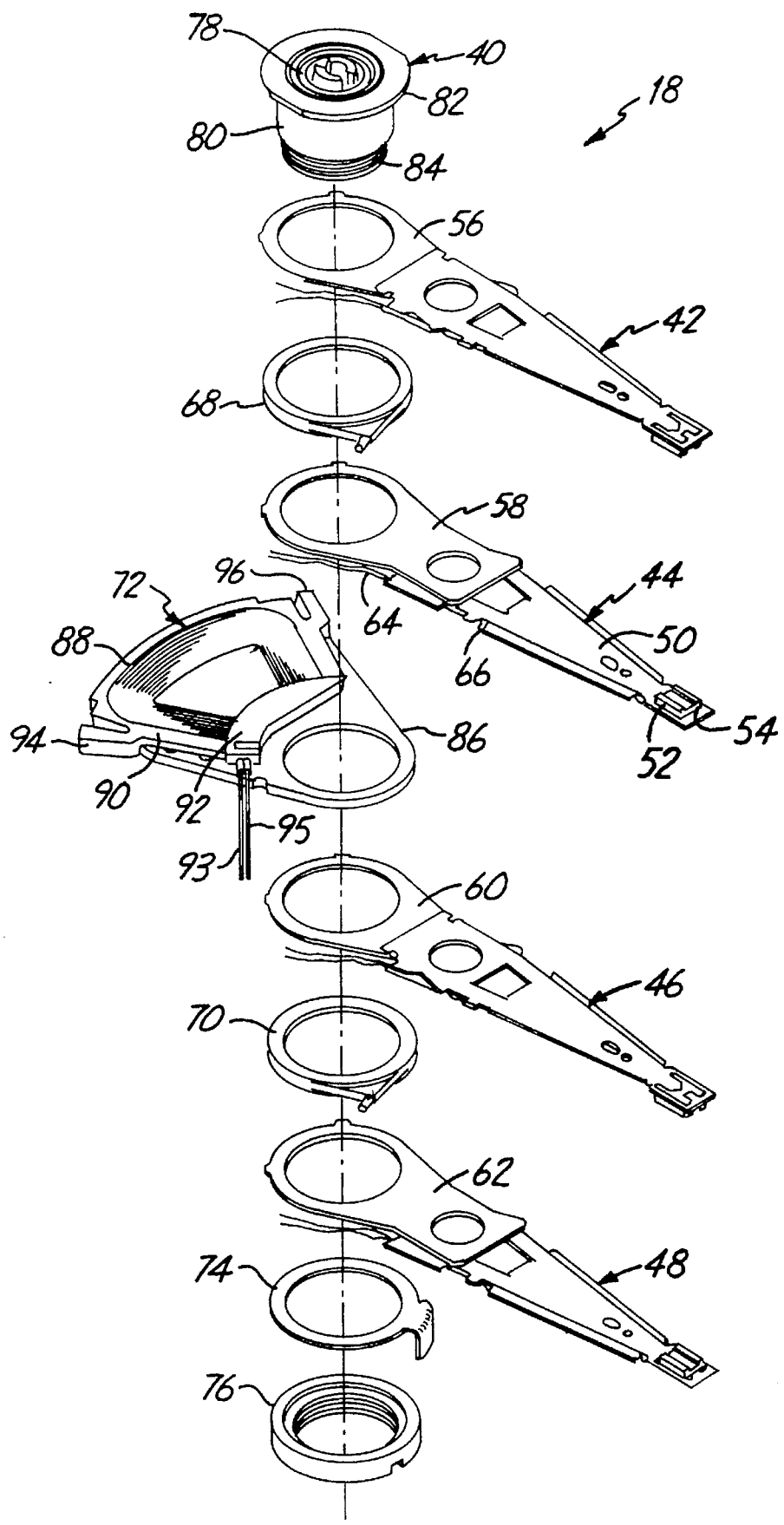
FIG. 2 is an exploded view of a stacked actuator system having an actuator arm assembly according to the present invention.

FIG. 2 is an exploded view of stacked actuator system 18. The particular stacked actuator system 18 shown in FIG. 2 is used in a disc drive having two discs. Stacked actuator system 18 includes pivot bearing assembly 40, a plurality of head gimbal assemblies 42, 44, 46, and 48, each including a load beam 50, a gimbal (not shown), a slider 52 and a transducer 54. For the sake of simplicity, these items are only numbered on head gimbal assembly 44. Each of the head gimbal assemblies is coupled to a support member 56, 58, 60 and 62, respectively.

Each of the head gimbat assemblies 42, 44, 46, and 48 also have conductors 56 coupled within a conductor sleeve 58, and connected to transducer 54. The conductors are coupled to appropriate signal conditioning circuitry and the conditioned signals are provided to drive controller 26.

Stacked actuator system 18 also includes a pair of spacers 68 and 70. Spacer 68 is coupled between support members 56 and 58 and spacer 70 is coupled between support members 60 and 62. Stacked actuator system 18 further includes actuator arm assembly 72, hook ring 74 and nut ring 76.

Pivot bearing assembly 40 includes an interior shaft 78 and an exterior sleeve 80. The exterior surface of shaft 78, and the interior surface of sleeve 80 define bearing races which are separated by ball bearings. In the preferred embodiment, two bearing races are separated by ball bearings, commonly nine ball bearings per race. Sleeve 80 includes a flange 82 which is disposed annularly about an upper portion of sleeve 80.

During assembly, all of the items comprising stacked actuator assembly 18 are placed over sleeve 80 to abut flange 82 in the order shown in FIG. 2. Nut ring 76 has a threaded interior surface that threadably mates with a threaded exterior end portion 84 of sleeve 80. After all the items comprising system 18 are placed onto sleeve 80, nut ring 76 threadably engages end 84 to secure the parts of system 18 together.

FIG. 2 shows that actuator arm assembly 72 includes an actuator arm 86, a voice coil 88, an overmold 90, and a spacer 92. Actuator arm 86 is typically a steel arm which includes a plurality of apertures (shown in FIGS. 4, 6 and 6A and described in greater detail later in the specification). Voice coil 88 is a conventional voice coil formed of appropriate conductors and used in positioning system 18. Overmold 90 is a plastic overmolding which connects voice coil 88 to actuator arm 86. The plastic overmold 90 is melted to flow over voice coil 88, attaching it to actuator arm 86 in a known manner.

FIG. 2 also shows that actuator arm assembly 72 includes crash stops 94 and 96. In the preferred embodiment, crash stops 94 and 96 are formed integrally with overmold 90 and extend from generally opposing edges defining the perimeter of actuator arm assembly 72. Crash stops 94 and 96 will also be described in greater detail later in the specification.

Cables 93 and 95 are connected to voice coil 88 and to drive controller 26 to control movement of system 18. Spacer 92 provides a strain relief for the connection of cables 93 and 95 to voice coil 88.

Figure 3:
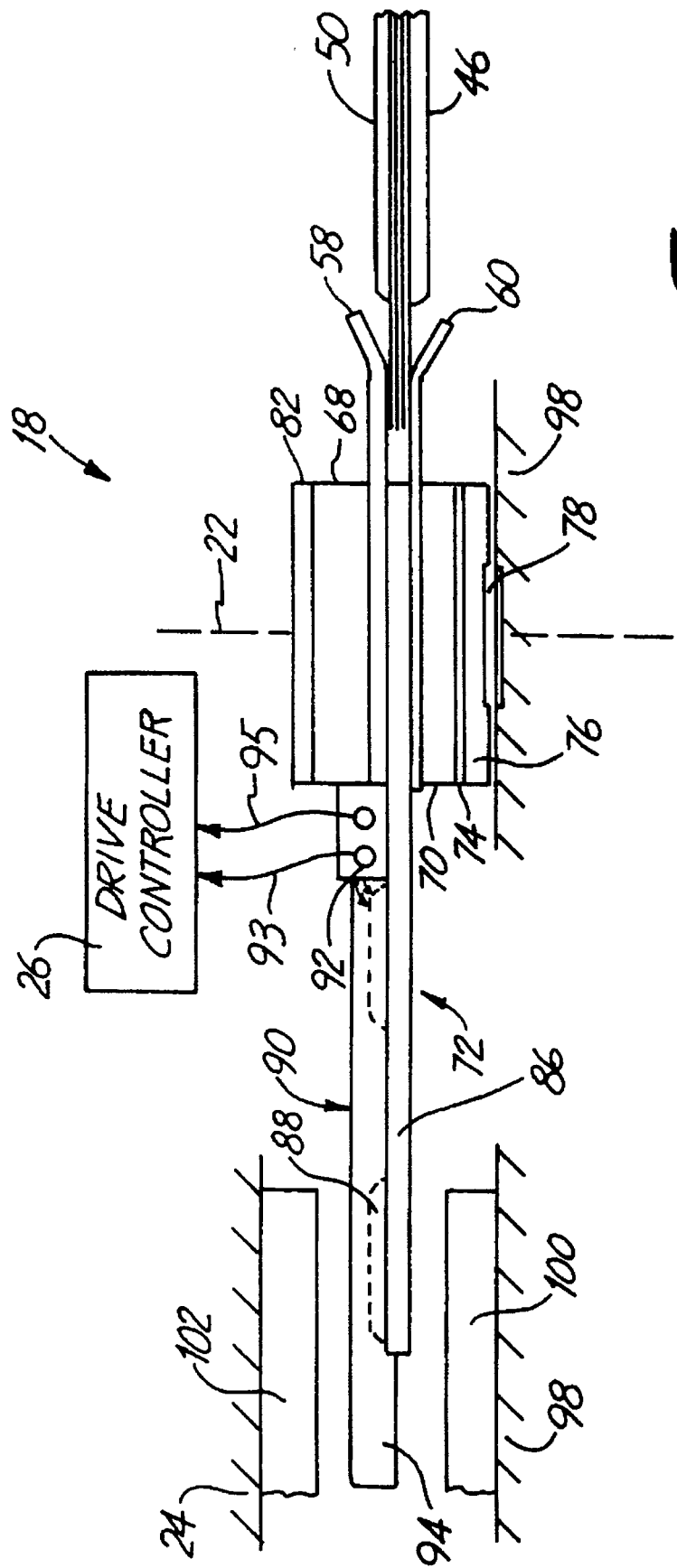
FIG. 3 is a side view of an assembled stacked actuator system.

FIG. 3 shows a side view of system 18 assembled. For the sake of clarity, system 18 shown in FIG. 3 includes only head gimbal assemblies 44 and 46 and support members 58 and 60. Head gimbal assemblies and 48 and support members 56 and 62 are eliminated. Similar items are similarly numbered to those shown in FIG. 2.

Shaft 78 of bearing assembly 40 is rigidly coupled to a base plate 98 of housing 16 in disc drive 10. Thus, actuator arm assembly 72 is pivotable with respect to base plate 98 about axis 22. FIG. 3 schematically shows conductors 93 and 95 coupled to drive controller 26. A pair of magnets 100 and 102 are coupled to base plate 98 and cover portion 24 of housing 16. A portion of voice coil 88, shown in phantom in FIG. 3, is positioned between magnets 100 and 102. Therefore, as drive controller 26 provides a signal via conductors 93 and 95 to voice coil 88, the magnetic fields from magnets 100 and 102 interact with voice coil 88 to produce movement of actuator arm assembly 72 (and correspondingly head gimbal assemblies 46 and 50) about axis 22.

Figure 4:
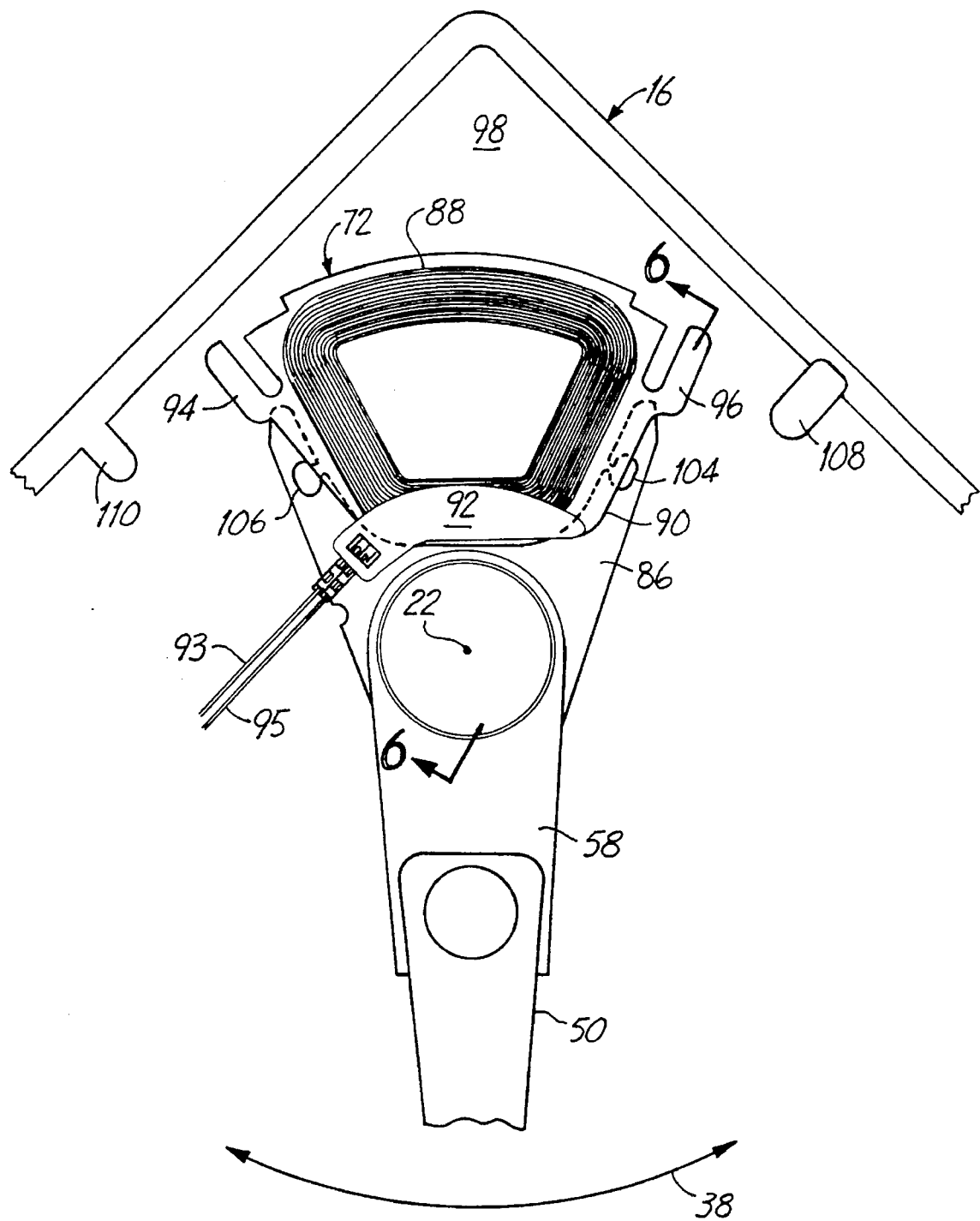
FIG. 4 is a top view of a portion of the stacked actuator system shown in FIG. 3, and showing the actuator arm assembly of the present invention.

FIG. 4 is a top view of actuator arm assembly 72 attached to support member 58 and a portion of head gimbal assembly 50. Actuator arm 86 is a generally Y-shaped member which is partially shown in phantom in FIG. 4, and which includes a pair of apertures 104 and 106. During assembly, overmold 90 flows over voice coil 88 and into apertures 104 and 106. When overmold 90 sets, it becomes rigidly attached to actuator arm 86 within apertures 104 and 106. Thus, overmold 90 rigidly attaches voice coil 88 to actuator arm 86. The configuration of apertures 104 and 106 will be shown in greater detail in FIGS. 6 and 6A.

As described with respect to FIG. 3, a pair of magnets interact with voice coil 88 when a signal is applied by conductors 93 and 95 producing pivotal movement of actuator arm assembly 72 about axis 22 as indicated by arrow 38. It is desirable to prevent actuator arm assembly 72 from pivoting too far in either direction to preclude the slider coupled to head gimbal assembly 50 from traveling too far toward the center of the associated disc, or traveling radially away from the center of the disc off the end of the surface of the disc. Therefore, base plate 98 is provided with a pair of stop pins 108 and 110. Stop pins 108 and 110 are positioned to engage crash stops 96 and 94, respectively, when actuator arm assembly 72 pivots to one of its extreme positions.

Figure 5:
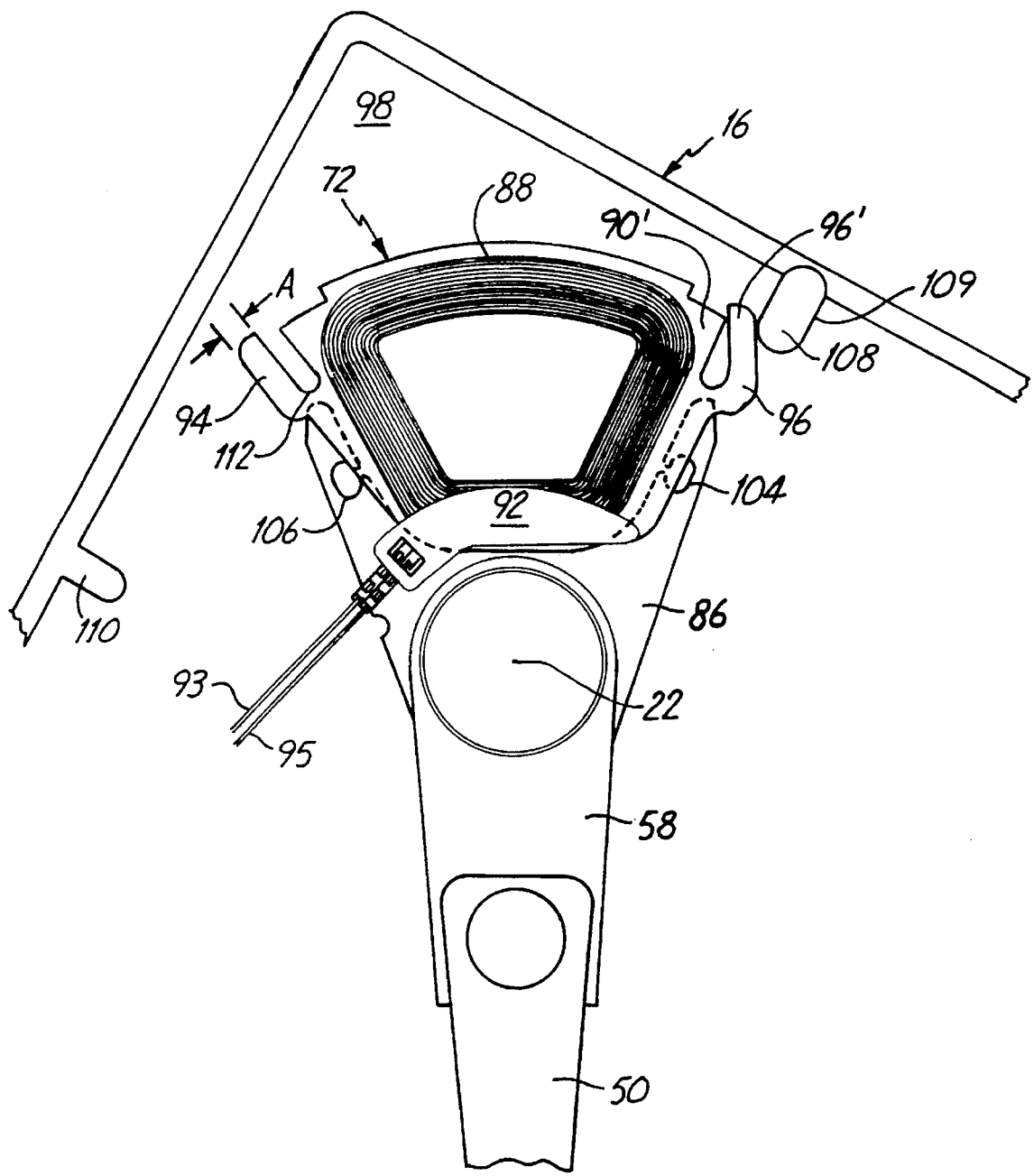
FIG. 5 shows the stacked actuator system of FIG. 4 in a first extreme position.

FIG. 5 shows actuator arm assembly 72 in a first extreme position in which the slider associated with head gimbal assembly 50 is flying above an outer radius of the magnetic disc. As actuator arm assembly 72 pivots from the position shown in FIG. 4 to the position shown in FIG. 5, crash stop 96 approaches stop pin 108 and eventually engages stop pin 108. As actuator arm assembly 72 continues to pivot to the position shown in FIG. 5, crash stop 96 deflects to the position shown in FIG. 5 in which an end portion 96' of crash stop 96 comes into contact with a body portion 90' of overmold 90. Deflection of crash stop 96, from the point where it first engages stop pin 108 until the point shown in FIG. 5, serves to slow movement of actuator arm assembly 72 to a more gradual stop. Thus, in the preferred embodiment, crash stops 94 and 96 are configured as cantilevered beams which extend out and away from body portion 90' of overmold 90.

Also, in the preferred embodiment, crash stops 94 and 96 are formed integrally with overmold 90. This substantially eliminates all assembly time and extra parts required for prior systems in which the crash stops were connected by screws or press fitting to the stop pins. In addition, in the preferred embodiment, the material used as overmold 90 (and hence crash stops 94 and 96) is of sufficient resilience to deflect to the position of crash stop 96 shown in FIG. 5, but also to provide some resistance to deflection in order to slow movement of actuator arm assembly 72 prior to reaching its extreme position. It has been found that polyphenylene sulfide (PPS) is an effective material with which to form overmold 90.

The dimensions of the cantilevered beams forming crash stops 94 and 96 depend upon the spring rate for any particular actuator system. For example, the more discs in drive 10, the more support members and head gimbal assemblies will be required in stacked actuator system 18. In addition, the size of the discs in the disc drive also determines the dimensions of components carried in stacked actuator system 18. All of these variations change the load driven by actuator arm assembly 72 and thus change the preferred dimensions for cantilevered arms 94 and 96 to achieve desired resilience. It has been observed that in a two-disc system having discs of 1.8 inch diameter, overmold 90 is preferably formed of PPS and has a thickness of 0.040 inches. In addition, dimension A of the cantilevered beams is 0.040 inches. Further, the radius of curvature of curve 112 is preferably 0.016 inches. These dimensions provide adequate performance for such a system. However, it will be understood that the dimensions, or material, or both, will change depending upon the load carried by actuator arm assembly 72, and depending upon desired performance parameters.

In the preferred embodiment, either stop pin 108 or stop pin 110 is formed integrally with base plate 98. In the embodiment shown in FIG. 5, stop pin 110 is formed integrally with base plate 98, while stop pin 108 is removably connected to base plate 98. In loading stacked actuator system 18 to the disc drive 10, stop pin 108 is removed so that system 18 can be pivoted beyond the extreme position shown in FIG. 5. This allows the head gimbal assemblies carried by actuator arm assembly 72 to be moved beyond the perimeter of the discs in the disc drive so that the head gimbal assemblies can be loaded into the disc drive. Then, actuator system 18 is pivoted back to a position between the extreme positions and stop pin 108 is fixedly attached to base plate 98. In the preferred embodiment, stop pin 108 is either screwed to base plate 98 or attached to base plate 98 through press fitting. When press fit, an aperture 109 is provided and is dimensioned properly relative to stop pin 108 so that stop pin 108 can be press fit into aperture 109.

Figure 6:
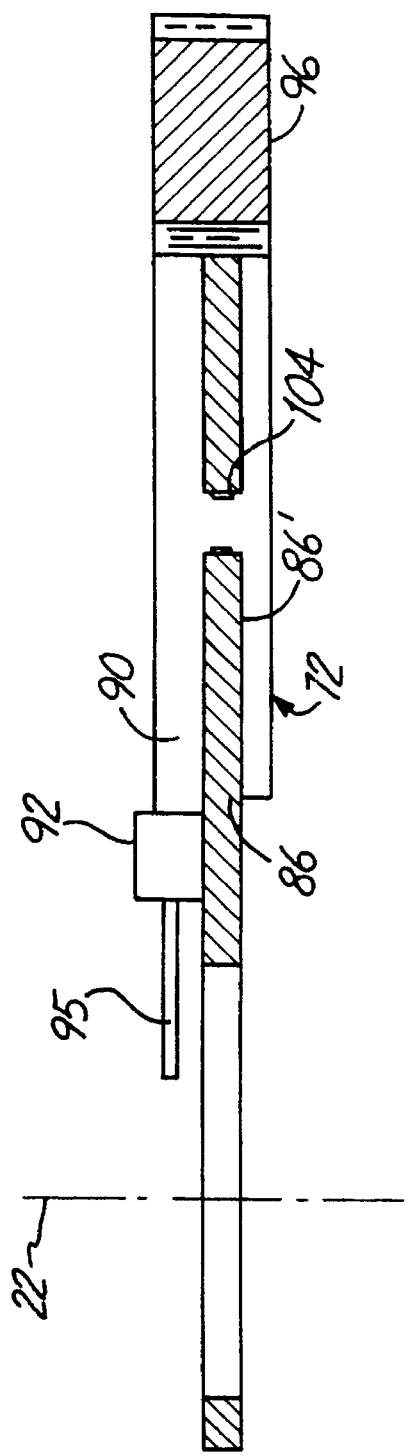
FIG. 6 is a side cross-sectional view of a portion of the actuator arm assembly of the present invention.

FIG. 6 shows a cross-sectional view of a portion of actuator arm assembly 72 taken along section lines 6—6 of FIG. 4. FIG. 6 illustrates that, during assembly of actuator arm assembly 72, overmold 90 encompases actuator arm 86 and is heated to flow through aperture 104 in actuator arm 86. Overmold 90 passes through aperture 104 and also covers a surface 86' of actuator arm 86. Overmold 90 is then allowed to set and become rigid. Thus, the portion of overmold 90 which extends through aperture 104 and encompasses actuator arm 86 rigidly connects overmold 90 to actuator arm 86. While crash stop 96 is illustrated having the same thickness as the remainder of overmold 90, the thickness of crash stop 96 can be varied to achieve a desired spring rate and to meet required performance parameters.

Figure 6A:
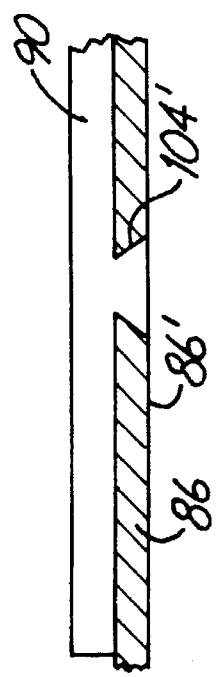
FIG. 6A is an alternative embodiment of the actuator arm assembly shown in FIG. 6.

FIG. 6A shows an alternative embodiment of attaching overmold 90 to actuator arm 86. In the embodiment shown in FIG. 6A, an aperture 104' is defined by chamfered sides. As overmold 90 is allowed to flow through aperture 104', it substantially fills the entire aperture 104', but remains flush with the bottom surface 86' of actuator arm 86. After overmold 90 sets, the portion which has flowed into aperture 104' rigidly locks overmold 90 to actuator arm 86, without extending below surface 86'. This embodiment is preferred in systems in which the axial height of stacked actuator system 18 is critical. Since none of the overmold material forming overmold 90 extends below surface 86', the axial height of the system is diminished.

CONCLUSION

The present invention provides an actuator arm assembly 72 which has attached crash stops 94 and 96. In the preferred embodiment, crash stops 94 and 96 are integrally formed with overmold 90 to eliminate assembly steps and to reduce parts count. In addition, in the preferred embodiment, one of the stop pins 108 and 110 is integrally formed with base plate 98. This also eliminates assembly steps and reduces parts count. The saving in assembly time and parts provide significant advantages over prior systems, while maintaining or improving system performance.

Although the present invention has been described with reference to preferred embodiments, workers skilled in the art will recognize that changes may be made in form and detail without departing from the spirit and scope of the invention.

What is claimed is:

1. A disc drive assembly, comprising:

a baseplate having a first stop pin;

an actuator arm assembly comprising an actuator arm, a voice coil and an overmold flowed over the voice coil and the actuator arm, wherein the overmold couples the voice coil to the actuator arm and has a perimeter, and wherein the overmold forms a first deflectable crash stop along the perimeter, with the first deflectable crash stop comprising a cantilevered beam with a distal end which is deflectable between a first position in which the distal end is spaced from the perimeter and a second position in which the distal end abuts the perimeter;

a bearing, coupled to the baseplate and the actuator arm assembly, for bearing the actuator arm assembly in movable relation to the baseplate;

a magnet, coupled to the baseplate, which interacts with the voice coil to cause movement of the actuator arm assembly relative to the baseplate;

a head gimbal assembly coupled to the actuator arm assembly;

a disc rotatably mounted to the baseplate and located proximate the actuator arm assembly so that movement of the actuator arm assembly causes movement of the head gimbal assembly over a surface of the disc; and wherein the first deflectable crash stop is positioned to engage the first stop pin and deflect to stop movement of the actuator arm assembly in a first direction relative to the baseplate.

2. The disc drive assembly of claim 1 wherein a portion of the perimeter is defined by a first edge and a second edge, generally opposing the first edge, the first deflectable crash stop extending away from the first edge and wherein:

the overmold forms a second deflectable crash stop extending away from the second edge.

3. The disc drive assembly of claim 1 wherein:

the actuator arm assembly further comprises a flexure arm coupled to the actuator arm; and the head gimbal assembly comprises a gimbal, coupled to the flexure arm and a head assembly coupled to the gimbal, the head assembly including a slider and a transducer coupled to the slider.

4. A disc drive, comprising:

a baseplate having a first stop pin and a second stop pin;

an actuator arm assembly including an actuator arm, a voice coil and an overmold flowed over the voice coil and the actuator arm, wherein the overmold couples the voice coil to the actuator arm and has a perimeter, and wherein the overmold forms first and second deflectable crash stops along the perimeter, with each crash stop having a cantilevered beam with a distal end which is deflectable between a first position in which the distal end is spaced from the perimeter and a second position in which the distal end abuts the perimeter;

bearing means, coupled to the baseplate and the actuator arm assembly, for bearing the actuator arm assembly in movable relation to the baseplate;

magnet means, coupled to the baseplate, for interacting with the voice coil to cause movement of the actuator arm assembly relative to the baseplate;

a head gimbal assembly coupled to the actuator arm assembly;

a disc rotatably mounted to the baseplate and located proximate the actuator arm assembly so that movement of the actuator arm assembly causes movement of the head gimbal assembly over a surface of the disc, the head gimbal assembly reading data from the disc and providing a data signal indicative of the data read from the disc;

control means, coupled to the head gimbal assembly and the voice coil, for controlling movement of the actuator arm and for receiving the data signal; and wherein the first and second deflectable crash stops are positioned to engage the first and second stop pins and deflect to stop movement of the actuator arm assembly in generally opposing directions relative to the baseplate.

5. The disc drive of claim 4 wherein the bearing means supports the actuator arm assembly for pivotal movement about a pivot point.

6. The disc drive of claim 5 wherein the first deflectable crash stop is positioned to engage the first stop pin to deflect and thereby stop movement of the actuator arm assembly in a first direction about the pivot point and wherein the second deflectable crash stop is positioned to engage the second stop pin to deflect and thereby stop movement of the actuator arm assembly in a second direction about the pivot point.

7. The disc drive of claim 6 wherein the first stop pin is formed in the baseplate.

8. The disc drive of claim 7 wherein the second stop pin is removably secured to the baseplate.

9. The disc drive of claim 8 wherein the baseplate includes a stop pin recess and wherein the second stop pin is pressfit into the stop pin recess.

10. The disc drive of claim 4 wherein the head gimbal assembly comprises:

a flexure arm coupled to the actuator arm;

a gimbal, coupled to the flexure arm; and a head assembly coupled to the gimbal, the head assembly including a slider and a transducer coupled to the slider, the transducer providing the data signal based on the data read from the disc.

11. A disc drive, comprising:

a baseplate having a first stop pin and a second stop pin;

an actuator arm assembly including an actuator arm, a voice coil and an overmold flowed over the voice coil and the actuator arm which couples the voice coil to the actuator arm, wherein the overmold has a perimeter and forms a first deflectable crash stop extending from the perimeter, with the first deflectable crash stop comprising a cantilevered beam with a distal end which is deflectable between a first position in which the distal end is spaced from the perimeter and a second position in which the distal end abuts the perimeter;

bearing means, coupled to the baseplate and the actuator arm assembly, for bearing the actuator arm assembly in movable relation to the baseplate;

magnet means, coupled to the baseplate, for interacting with the voice coil to cause movement of the actuator arm assembly relative to the baseplate;

a head gimbal assembly coupled to the actuator arm assembly;

a disc rotatably mounted to the baseplate and located proximate the actuator arm assembly so that movement of the actuator arm assembly causes movement of the head gimbal assembly over a surface of the disc, the head gimbal assembly reading data from the disc and providing a data signal indicative of the data read from the disc;

control means, coupled to the head gimbal assembly and the voice coil, for controlling movement of the actuator arm and for receiving the data signal; and wherein the first deflectable crash stop is positioned to engage the first stop pin and deflect to stop movement of the actuator arm assembly in a first direction relative to the baseplate.

12. The disc drive of claim 11 wherein a portion of the perimeter is defined by a first edge and a second edge, generally opposing the first edge, the first deflectable crash stop extending away from the first edge and wherein:

the overmold forms a second deflectable crash stop extending away from the second edge;

wherein the bearing means supports the actuator arm assembly for pivotal movement about a pivot point; and wherein the first deflectable crash stop is positioned to engage the first stop pin to stop movement of the actuator arm assembly in the first direction about the pivot point and wherein the second deflectable crash stop is positioned to engage the second stop pin to stop movement of the actuator arm assembly in a second direction about the pivot point.

* * * * *